United States Patent [19]

Friedmann

[11] Patent Number: 4,760,754
[45] Date of Patent: Aug. 2, 1988

[54] APPARATUS FOR TRANSMITTING TORQUE BETWEEN FLYWHEELS IN THE POWER TRAIN BETWEEN THE ENGINE AND THE TRANSMISSION OF A MOTOR VEHICLE

[75] Inventor: Owald Friedmann, Lichtenau, Fed. Rep. of Germany

[73] Assignee: Luk Lamellen und Kupplungsbau GmbH, Bühl, Fed. Rep. of Germany

[21] Appl. No.: 17,734

[22] Filed: Feb. 24, 1987

[30] Foreign Application Priority Data

Feb. 27, 1986 [DE] Fed. Rep. of Germany ....... 3606299

[51] Int. Cl.⁴ .................... F16F 15/12; F16D 3/14
[52] U.S. Cl. .................... 74/574; 192/56 R; 192/106.2; 464/46; 464/68
[58] Field of Search ............ 192/70.17, 106.2, 106.1, 192/30 V, 56 R; 74/574; 464/46, 64, 66, 68

[56] References Cited

U.S. PATENT DOCUMENTS

| | | | |
|---|---|---|---|
| 4,220,233 | 9/1980 | Ban et al. | 192/106.2 |
| 4,274,524 | 6/1981 | Nakane | 192/70.17 X |
| 4,468,207 | 8/1984 | Yoshida | 192/106.2 X |
| 4,662,239 | 5/1987 | Wörner et al. | 74/574 |
| 4,663,983 | 5/1987 | Kobayashi et al. | 74/574 |

FOREIGN PATENT DOCUMENTS

| | | | |
|---|---|---|---|
| 2153970 | 8/1985 | United Kingdom | 192/70.17 |
| 2160296 | 12/1985 | United Kingdom | 464/64 |

*Primary Examiner*—Rodney H. Bonck
*Assistant Examiner*—Richard M. Lorence
*Attorney, Agent, or Firm*—Peter K. Kontler

[57] ABSTRACT

Apparatus for transmitting torque between a first flywheel and a second flywheel in the power train between the crankshaft of the engine and the input shaft of the change-speed transmission of a motor vehicle has a friction generating device which is connected in series with a first damper which, in turn, is connected in series with a second damper. A slip clutch is provided in series with the friction generating device.

28 Claims, 4 Drawing Sheets

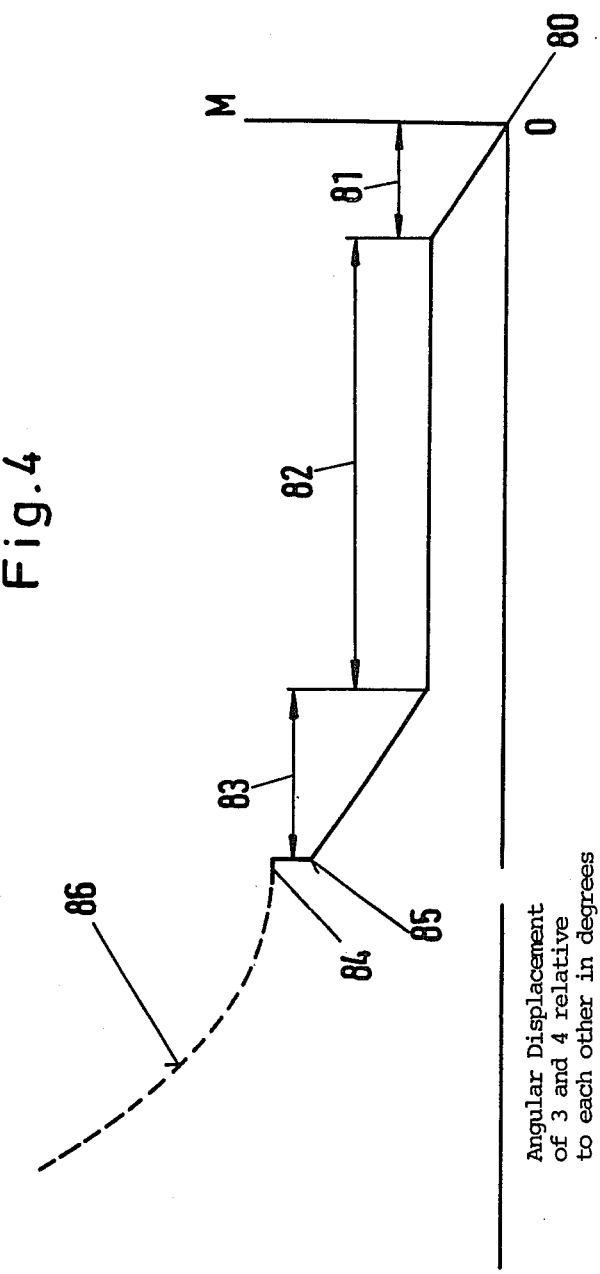

APPARATUS FOR TRANSMITTING TORQUE BETWEEN FLYWHEELS IN THE POWER TRAIN BETWEEN THE ENGINE AND THE TRANSMISSION OF A MOTOR VEHICLE

CROSS-REFERENCE TO RELATED CASES

The assignee of the present application owns numerous pending United States and foreign patent applications and granted United States and foreign Letters Patent describing torque transmitting apparatus which employ parts and/or combinations of parts similar or analogous to those used in the apparatus of the present invention.

BACKGROUND OF THE INVENTION

The present invention relates to apparatus for transmitting torque between two relatively rotatable flywheels, particularly in the power train between the output element of the internal combustion engine and the input element of the change-speed transmission in a motor vehicle. More particularly, the invention relates to improvements in apparatus for transmitting torque in such a way that peaks of transmitted torque are eliminated with attendant prolongation of the useful life of the power train.

It is well known to provide one or more dampers intermediate the relatively rotatable flywheels of a power train between the crankshaft of the internal combustion engine and the input shaft of the change-speed transmission in a motor vehicle. The damper or dampers allow for a relatively small angular displacement of the flywheels relative to each other. In many instances, the means for transmitting torque between the two flywheels comprises energy storing elements in the form of coil springs which act in the circumferential direction of the flywheels and are installed to operate in parallel with friction generating or slip torque generating means.

A drawback of presently known apparatus for transmitting torque is that the energy storing elements (such as the aforementioned coil springs) of the damping means must perform relatively large movements between fully expanded and fully compressed positions in response to angular displacements of the flywheels relative to each other. Consequently, the length of the coil springs must be selected in such a way that they exhibit a relatively small amount of rigidity so that they cannot resist deformation under the action of centrifugal forces. Such deformation or flexing in the axial direction of the energy storing components cannot ensure adequate (predetermined) proping in the radial direction and/or an optimal application of force to their end convolutions during compression. The result is that the surfaces of contact between the energy storing springs and the adjacent parts of the apparatus are subjected to excessive wear which results in relatively short useful life of the energy storing elements as well as of the entire apparatus.

OBJECTS AND SUMMARY OF THE INVENTION

An object of the invention is to provide a novel and improved apparatus the component parts of which are subjected to less pronounced wear than the component parts of the aforedescribed conventional apparatus and which can stand longer periods of uninterrupted or sporadic use than heretofore known apparatus.

Another object of the invention is to provide an apparatus the versatility of which greatly exceeds that of conventional apparatus and which can be produced and assembled at a fraction of the cost of heretofore known apparatus.

A further object of the invention is to provide novel and improved torque transmitting components intermediate the relatively rotatable flywheels in the power train between the engine and the change-speed transmission of a motor vehicle.

An additional object of the invention is to provide novel and improved combinations of dampers, friction generating means and slip clutch means in an apparatus of the above outlined character.

Still another object of the invention is to provide a novel and improved method of prolonging the useful life of the apparatus which transmits torque between the crankshaft of the internal combustion engine and the input shaft of the change-speed transmission in a motor vehicle.

A further object of the invention is to provide a novel and improved power train which embodies the above outlined apparatus and to provide a novel and improved motor vehicle which embodies the power train.

An additional object of the invention is to provide novel and improved means for varying the magnitude of torque which can be transmitted by the apparatus in response to changing rotational speed of the engine.

The invention resides in the provision of an apparatus for transmission of torque between two flywheels which are rotatable relative to each other. The first flywheel is connectable with the output element (such as a crankshaft) of the internal combustion engine, and the second flywheel is connectable with the input element (such as a shaft) of the change-speed transmission in a motor vehicle, preferably through the medium of a friction clutch. The apparatus comprises a friction generating device which has means for opposing rotation of the flywheels relative to each other through a predetermined angle and is devoid of means for biasing the flywheels counter to their directions of rotation relative to each other, at least within a portion of the predetermined angle. The apparatus further comprises two dampers which operate in series with one another and with the friction generating device. The apparatus preferably further comprises slip clutch means which is in series with the friction generating device.

At least one of the dampers comprises a set of energy storing elements (such as coil springs) and at least one of the dampers can further comprise at least one friction generating unit.

The dampers can include means for simultaneously opposing rotation of the flywheels starting from a neutral angular position of the flywheels relative to each other. The dampers can have different or identical stop pin or stop torques. This term is intended to denote that the damping action of one damper terminates at the same stage of angular movement of the flywheels relative to each other as the damping action of the other damper.

The dampers include a first damper and a second damper which is in series with the first damper. The slip clutch means can be arranged to receive torque from one of the flywheels (particularly from the first flywheel) and has an output member which can form-lockingly engage the output member of the friction generating device. The input member of the first damper can constitute the output member of the friction generating device. Cooperating friction generating rings can be interposed between the one flywheel and the slip clutch means. The energy storing elements are interposed between the input and output member of each damper, and the input member of the second damper can constitute the output member of the first damper. Means can be provided for non-rotatably securing the output member of the second damper to the other flywheel (particularly the second flywheel), and such securing means is preferably disposed at a predetermined radial distance from the axes of the flywheels. The energy storing means of the second damper is preferably disposed at or close to such predetermined radial distance from the axes of the flywheels. The output member of the slip clutch means is preferably disposed radially outwardly of the input member of the first damper and the input member of the first damper is preferably integral with the output member of the friction generating device. The output member of the slip clutch means can comprise a first disc, and the input member of the first damper can include a second disc. Such discs are preferably disposed in a common plane extending at right angles to the axes of the flywheels.

The output member of the first damper can comprise two disc-shaped members which flank the input member of the first damper and constitute the input member of the second damper. The output member of the second damper can be disposed between the disc-shaped members.

The output member of the friction generating device is preferably integral with the input member of the first damper. Furthermore the output members of the friction generating device, slip clutch means and second damper are preferably disposed at different radial distances from the axes of the flywheels. The output members of the slip clutch means, friction generating device and second damper are preferably disposed in or close to a common plane which extends at right angles to the axes of the flywheels.

The number of energy storing elements in one of the dampers preferably exceeds the number of energy storing elements in the other of the dampers. The arrangement is preferably such that the number of energy storing elements in the first damper is a whole multiple of the number of energy storing elements in the second damper. The energy storing elements of one of the dampers are preferably staggered with reference to the energy storing elements of the other damper in the circumferential direction of the flywheels. If the number of energy storing elements in the first damper is twice the number of energy storing elements in the second damper, pairs of energy storing elements of the first damper preferably alternate with discrete energy storing elements of the second damper, as considered in the circumferential direction of the flywheels.

The input member of the first damper is preferably provided with at least one elongated slot which is disposed radially outwardly of an energy storing element of the second damper, and with a distancing element which extends through the slot with a predetermined freedom of angular movement in the circumferential direction of the flywheels. Analogously, the input member of the second damper can have at least one slot which is disposed between two energy storing elements of the second damper and is disposed radially inwardly of two energy storing elements of the first damper.

Such apparatus preferably further comprises means for securing the output member of the second damper to one of the flywheels with a predetermined freedom of angular movement of the one flywheel and the output member of the second damper relative to each other. The securing means comprises a distancing element which is anchored in the one flywheel and extends into the slot with the predetermined freedom of movement relative to the input member of the second damper in the circumferential direction of the flywheels.

The output member of one of the dampers can be provided with means for centering the input member of the other damper. The energy storing elements of one of the dampers are preferably coplanar with the energy storing elements of the other damper.

The input and output members of the friction generating device are movable angularly relative to each other in the circumferential direction of the flywheels through a predetermined distance. The apparatus preferably further comprises resilient stop means (for example, relatively small and weak coil springs) which is operative to damp the impact of the input and output members of the friction generating device upon each other shortly prior to completion of angular movement through the predetermined distance. In the absence of such stop means, the friction generating device is completely devoid of any means for yieldably biasing the two flywheels counter to the direction of their rotation relative to each other. In accordance with a presently preferred embodiment, the input or output member of the friction generating device has a projection which extends into a cutout of the other of the input and output members of the friction generating device. The projection is received in the cutout with freedom of angular movement through the aforementioned predetermined distance, and the resilient stop means is preferably disposed in the cutout and flanks the projection.

The aforementioned means for securing the output member of one of the dampers (particularly the second damper) to the second flywheel with a predetermined freedom of angular movement of the output member of the one damper relative to the second flywheel preferably comprises at least one rivet-shaped or similar distancing element which is anchored in the second flywheel. The input member of the damper which is secured to the second flywheel preferably comprises two discs and one of the discs has at least one slot. As mentioned above, the securing means can comprise a distancing element which is anchored in the second flywheel and extends into the slot with the predetermined freedom of movement on the distancing element and the one disc relative to each other. One of the dampers can comprise two spaced-apart discs which together constitute the input or output member of the respective damper. Such one damper further comprises at least one distancing element which connects the discs to one another for joint rotation about the axes of the flywheels, and the output member of the one damper has a slot for a portion of the distancing element. Such portion of the distancing element is received in the slot with predetermined freedom of angular movement of the input and output members of the one damper relative to each other. The energy storing elements of the one damper are preferably disposed at the same radial distance from the axes of the flywheels as the just mentioned slot and distancing element or elements.

The mass of energy storing elements of one of the dampers is preferably less than the mass of energy storing elements of the other damper. The arrangement is preferably such that the energy storing elements of the first damper (which surrounds the second damper) are lighter and weaker than the energy storing elements of the second damper which is nearer to the axes of the flywheels.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 4 is a diagram wherein the angular displacement of the flywheels relative to each other is measured along the abscissa and the transmitted torque is measured along the ordinate.

DESCRIPTION OF THE PREFERRED EMBODIMENTS

Figure 1:
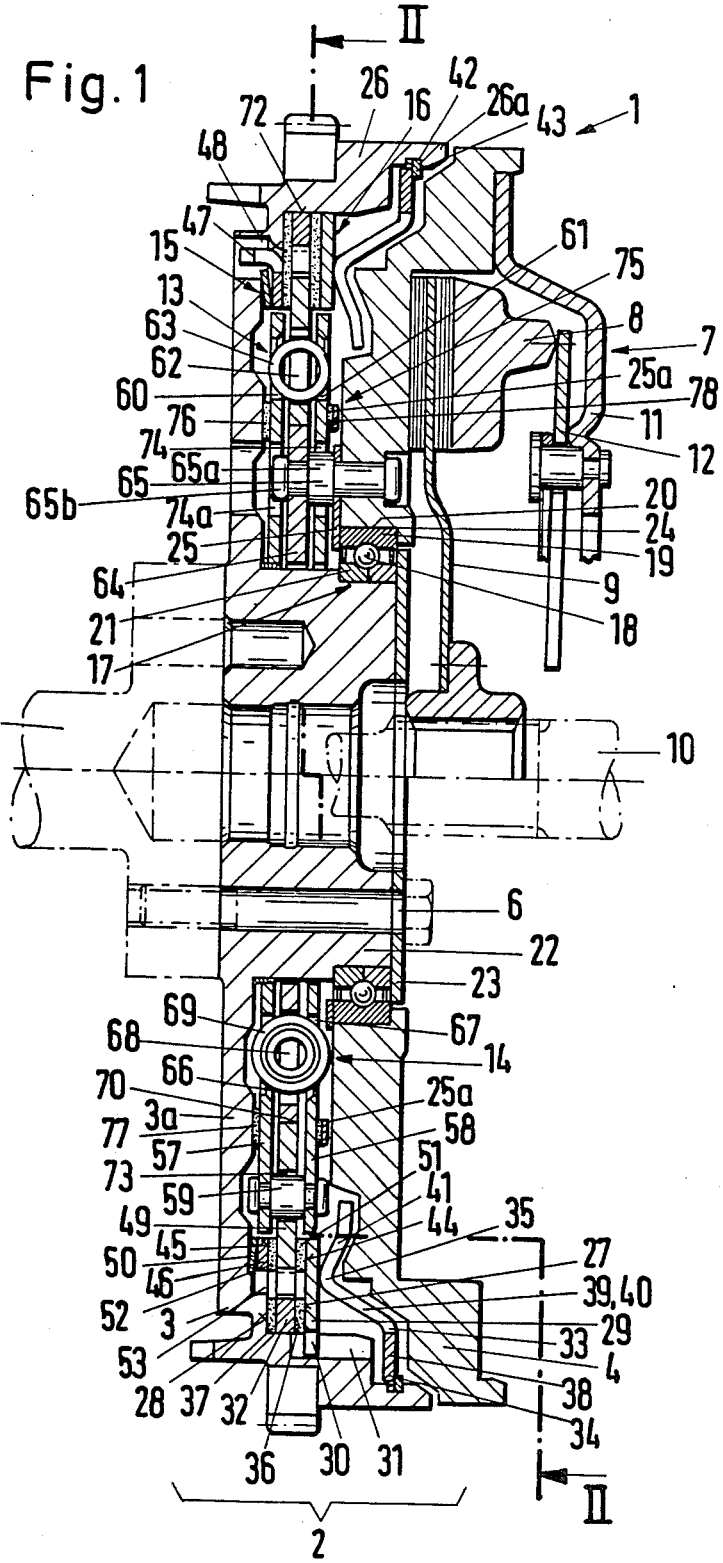
FIG. 1 is an axial sectional view of an apparatus which embodies one form of the invention, the output element of the engine and the input element of the change-speed transmission being shown by phantom lines.
Figure 2:
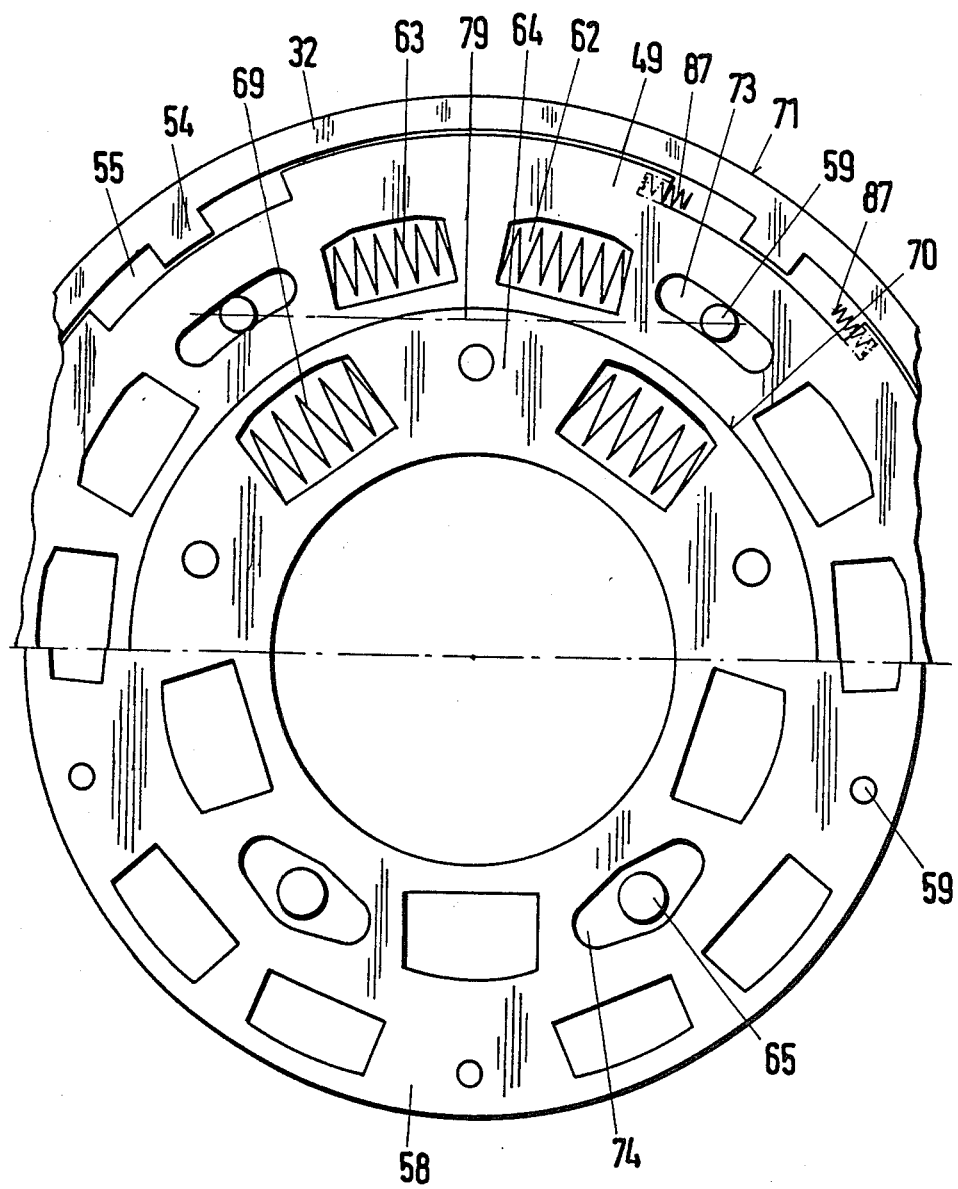
FIG. 2 is a sectional view as seen in the direction of from the line II—II of FIG. 1, with certain parts of the apparatus omitted for the sake of clarity.

Referring to FIGS. 1 and 2, there is shown an arrangement which compensates for shocks in the transmission of torque between the output element 5 of the internal combustion engine and the input element 10 of the change-speed transmission in a motor vehicle. The output element 5 is a crankshaft which is secured to the first flywheel 3 of a composite flywheel 2 by a set of bolts 6 or similar fasteners. The composite flywheel 2 further comprises a second flywheel 4 which is rotatable relative to the flywheel 3 against the opposition of an apparatus 1 which embodies the present invention and includes a friction generating device 15 in series with a slip clutch 16 as well as with a first elastic damper 13 and a second elastic damper 14. The dampers 13, 14 are mounted in series with one another.

The flywheel 4 can transmit torque to the input shaft 10 of the change speed transmission through the medium of a friction clutch 7 including a cover or housing 11 which is non-rotatably secured to the flywheel 4, a pressure plate 8 which is disposed between the flywheel 4 and the cover 11, a clutch plate 9 having friction linings disposed between the pressure plate 8 and the adjacent friction surface of the flywheel 4, and a diaphragm spring 12 which is tiltably mounted at the inner side of the cover 11 and normally biases the pressure plate 8 against the adjacent friction lining of the clutch plate 9 so that the other friction lining of the clutch plate is urged against the friction surface of the flywheel 4. The hub of the clutch plate 9 is non-rotatably secured to the input element 10 of the change-speed transmission. The means for disengaging the clutch (by tilting the diaphragm spring 12 relative to the cover 11 so as to allow the pressure plate 8 and flywheel 4 to rotate relative to the clutch plate 9 and vice versa) is not shown in the drawing. Such disengaging means can comprise a bearing which is movable axially into and from engagement with the radially inwardly extending prongs of the diaphragm spring 12.

The dampers 13, 14 are installed between the flywheels 3 and 4. As stated above, such dampers are mounted in series with the friction generating device 15 which allows the flywheels 3 and 4 to perform limited angular movements relative to each other as soon as the torque which the friction generating device 15 can transmit is exceeded. The slip clutch 16 is also disposed between the flywheels 3 and 4 and is mounted in series with the friction generating device 15.

The apparatus 1 further comprises bearing means 17 which is interposed between the flywheels 3 and 4 and includes an antifriction angular contact ball bearing 18 with a split inner race 21. The outer race 19 of the ball bearing 18 is installed in an axial recess 20 of the flywheel 4, and the inner race 21 of the bearing 18 is mounted on an axial protuberance 22 which is a cylindrical stub extending axially in a direction away from the crankshaft 5 of the engine and into the recess 20 of the flywheel 4. The protuberance 22 is integral with the flywheel 3.

The inner race 21 of the bearing 18 is held against axial movement by a disc-shaped retainer 23 which is secured to the front end face of the protuberance 22. The means for securing the disc-shaped retainer 23 to the protuberance 22 preferably includes the aforementioned bolts 6 which releasably secure the crankshaft 5 to the first flywheel 3.

The entire bearing 18 is held against axial movement relative to the flywheel 4 by being installed between an internal shoulder 24 in the recess 20 of the flywheel 4 and a disc-shaped retainer 25 which is rigidly secured to the left-hand end face of the flywheel 4, as seen in FIG. 1.

The radially outermost portion 26 of the flywheel 3 constitutes a relatively short sleeve which extends axially in a direction toward the flywheel 4 and surrounds the dampers 13, 14 which are yieldable in the circumferential direction of the flywheels and are disposed radially inwardly of the friction generating device 15 as well as radially inwardly of the slip clutch 16. The slip clutch 16 is disposed radially outwardly of the friction generating device 15, i.e., at a greater radial distance from the axes of the flywheels 3 and 4. The slip clutch 16 is coaxial with the friction generating device 15, and the clutch 16 of the improved apparatus 1 is disposed in or close to the plane of the friction generating device 15, namely a plane which extends at right angles to the axes of the flywheels 3 and 4. As shown in FIG. 1, the distance between the slip clutch 16 and the axes of the flywheels 3 and 4 need not appreciably exceed the distance between such axes and the friction generating device 15.

The slip clutch 16 has two annular friction generating surfaces 27, 28 which are axially spaced apart from each other and are not rotatable relative to the first flywheel 3. The purpose of the friction surfaces 27, 28 is to transmit torque, which is generated by the engine and is transmitted by the crankshaft 5 to the flywheel 3, on toward the flywheel 4 when the flow of power is in the direction from the engine toward the change-speed transmission. In the embodiment which is shown in FIGS. 1 and 2, the friction surface 28 is provided immediately on the flywheel 3 and the friction surface 27 is provided on a disc 29. The radially outermost portion of the disc 29 is provided with a radially extending projections 30 which are received in suitable recesses 31 in the internal surface of the sleeve 26 so as to ensure that the disc 29 is movable axially of but cannot rotate relative to the flywheel 3. The recesses 31 can constitute spaces between axially parallel internal teeth of the sleeve 26. Since the disc 29 is movable axially relative to the flywheel 3, the friction surface 28 of this disc is also movable axially relative to the friction surface 28 on the flywheel 3. The friction surfaces 27 and 28 flank a disc-shaped flange 32 which constitutes the output member of the slip clutch 16. The means for biasing the disc 29 toward the flange 32, so as to ensure that the flange 32 is clamped between the friction surfaces 27 and 28, comprises a diaphragm spring 33 the radially outermost marginal portion 34 of which reacts against the sleeve 26 of the flywheel 3 and the radially inner portions 35 of which bear against the disc 29 so as to bias the latter axially in a direction toward the friction surface 28. Friction linings 36, 37 are disposed at opposite sides of the flange 32, i.e., between the friction surfaces 27, 28 and the respective sides of the flange 32. The friction linings 36, 37 transmit torque from the sleeve 26 of the flywheel 3 and disc 29 to the flange 32 when the apparatus 1 is in actual use.

If the friction linings 36, 37 are circumferentially complete washers, they can be loosely inserted between the flange 32 and the respective friction surfaces 27 and 28. If each of the friction linings 36, 37 comprises several arcuate portions, such portions can be bonded to the respective sides of the flange 32.

The diaphragm spring 33 is installed in prestressed condition and its radially outermost portion 34 includes a circumferentially complete washer-like section 38 which is integral with radially inwardly extending tongues 39 including the aforementioned portions 35 which act upon the respective side of the disc 29. The tongues 39 are bent in such a way that each thereof includes a radially outermost portion 40 integral with the annular section 38 of the radially outermost portion 34, and radially inner portions 41 which are inclined relative to the portions 40 and are axially offset relative to the annular section 38. The inclination of the portions 40, as considered in the axial direction of the composite flywheel 2, is much more pronounced than the inclination of the portions 41.

The sleeve 26 of the flywheel 3 comprises a relatively thin end portion 26a the internal surface of which has a circumferentially complete internal groove 42 for a slip ring 43 which extends radially inwardly beyond the internal surface of the end portion 26a and abuts the radially outermost portion 34 of the prestressed diaphragm spring 33.

The friction generating device 15 is disposed radially inwardly of the slip clutch 16 and serves to transmit torque from the slip clutch 16 to the first or outer damper 13 which latter is mounted in series with the second or inner damper 14. The device 15 has two axially spaced apart annular friction surfaces 44, 45 which are non-rotatably secured to the first flywheel 3 and by means of which at least a portion of torque which is generated by the internal combustion engine can be transmitted to the damper 13. In the embodiment which is shown in FIGS. 1 and 2, the friction surface 44 is provided on the radially inner marginal portion of the disc 29 so that the disc 29 forms a component of the friction generating device 15 as well as of the slip clutch 16 since the radially outer portion of the disc 29 defines the aforementioned friction surface 27 of the slip clutch 16. The friction surface 45 of the damper 13 is defined by a ring-shaped or disc-shaped friction generating element 46 of the damper 13. The radially outermost portion of the element 46 (hereinafter disc) has axially extending projections 47 which hold the disc 46 against rotation relative to the flywheel 3 and, to this end, project into complementary recesses 48 of the flywheel 3. The configuration and mutual positioning of the recesses 48 and projections 47 are such that the disc 46 is movable axially relative to the flywheel 3 but cannot rotate relative thereto. Consequently, the friction surface 45 is movable toward and away from but cannot turn relative to the friction surface 44. The device 15 further comprises an output member in the form of an intermediate disc or flange 49 which is clamped between the friction surfaces 44 and 45, i.e., between the discs 29 and 46. The means for biasing the discs 29, 46 toward the respective sides of the flange 49 comprises a diaphragm spring 50 the radially outermost portion of which bears axially against the radial flange 3a of the flywheel 3 and the radially inner portion of which bears against the disc 46 axially in a direction to urge the disc 46 and its friction surface 45 toward the friction surface 44. Friction linings 51, 52 are disposed between the friction surfaces 44, 45 and the respective sides of the flange 49. If desired, the friction linings 51, 52 can be integral with the respective friction linings 36, 37. The friction linings 51, 52 transmit torque which can be transmitted by the friction generating device 15.

As can be seen in FIG. 1, the friction surfaces 28 and 45 are disposed in a first common plane, and the friction surfaces 27, 44 are disposed in a second common plane. Such planes extend at right angles to the axes of the flywheels 3 and 4. The flywheel 3 has an axially extending recess 53 which is disposed radially inwardly of the friction surface 28 and confines the disc 46 and the diaphragm spring 50.

The diaphragm springs 33 and 50 react against the flywheel 3 are stressed in such a way that the spring 33 biases the slip clutch 16 in a first axial direction while the spring 50 biases the friction generating device 15 in a second axial direction counter to the first direction. In other words, the force which is applied by the diaphragm spring 33 acts counter to the direction of force which is applied by the spring 50. The bias of the diaphragm spring 33 exceeds the bias of the diaphragm spring 50. This ensures that the slip clutch 16 remains axially biased and is effective even at very low rotational speeds of the flywheels 3 and 4.

The flanges 32 and 49 have limited freedom of angular movement relative to each other. To this end, the flange 32 has one or more radially inwardly extending tooth-shaped projections 54 which are received with circumferential play in cutouts 55 provided therefor in the periphery the flange 49. This can be readily seen in FIG. 2. In the illustrated embodiment, the flanges 32 and 49 can turn relative to each other through angles of approximately 25°.

The flange 49 constitutes the output member of the friction generating device 15 as well as the input member of the elastic damper 13. The damper 13 further comprises two discs 57 and 58 which are disposed at opposite sides of the flange 49 and are non-rotatably connected to each other at a fixed axial distance from one another by distancing elements in the form of rivets 59. This can be seen in the lower part of FIG. 1. The discs 57, 58 constitute the output member of the first damper 13 as well as the input member of the second damper 14 which is connected in series with the damper 13. The discs 57 and 58, as well as the adjacent portions of the flange 49, have windows 60, 61 and 62 which serve to receive energy storing members in the form of coil springs 63. The coil springs 63 oppose angular displacements of the flange 49 and discs 57, 58 relative to each other.

The apparatus 1 further comprises a third intermediate disc or flange 64 which is disposed radially inwardly of the flange 49 and is flanked by the discs 57 and 58. The flange 64 constitutes the output member of the second damper 14. Distancing elements 65 in the form of rivets are provided to non-rotatably secure the flange 64 to the flywheel 4. At the same time, the distancing elements 65 constitute a means for securing the disc 25 to the flywheel 4.

The discs 57, 58 and the adjacent portions of the flange 64 between such discs have windows 66, 67 and 68 which are disposed radially inwardly of the aforementioned windows 60, 61, 62 and receive portions of energy storing elements 69 in the form of coil springs serving to oppose rotation of the input member (discs 57, 58) of the second damper 14 relative to the output member (flange 64) of the damper 14.

FIG. 1 shows that the flange 64 is substantially coplanar with the flange 49, i.e., with the output member of the outer damper 13. The arrangement is preferably such that the radially inner flange 49 is centered by the radially outer flange 64. The peripheral surface of the inner flange 64 and the internal surface of the outer flange 49 are denoted by the reference characters 70. The peripheral surface 71 of the flange 32 (which is the output member of the slip clutch 16) is centered by the adjacent portion 72 of the internal surface of the sleeve 26 of the flywheel 3.

FIG. 2 shows that the distancing elements or rivets 59 are disposed radially outwardly of the coil springs 69 and alternate with the coil springs 63, as considered in the circumferential direction of the flywheels 3 and 4. Portions of the distancing elements 59 extend through circumferentially extending elongated slots 73 which are provided in the flange 49. In this manner, the distancing elements 59 determine the extent of angular movability of the flywheels 3 and 4 relative to each other within the range of operation of the first damper 13. In other words, the input and output members of the damper 13 are compelled to rotate as a unit as soon as the distancing elements 59 reach the one or the other end of the respective slots 73.

FIG. 2 shows that the number (ten) of coil springs 63 in the first damper 13 is twice the number of coil springs 69 in the second damper 14. The outer coil springs 63 are disposed in pairs, and such pairs alternate with the slots 73 for the distancing elements 59. The slots 73 are disposed radially outwardly of the coil springs 69 and radially inwardly of the respective cutouts 55 in the periphery of the flange 49. The inner coil springs 69 alternate with the distancing elements 65. Each distancing element 65 is disposed radially inwardly of the relatively narrow space between two adjoining coil springs 63 of the outer damper 13. As shown in FIG. 1, each distancing element 65 has a head 65b at one side of the flange 64 and an enlarged portion or boss 65a at the other side of the flange 64. This ensures that the flange 64 is held at a fixed distance from the adjacent end face of the flywheel 4. The bosses 65a of the distancing elements 65 are received with requisite circumferential play in suitably configured elongated slots 74 of the disc 58 between the flywheel 4 and the flange 64. The extent to which the input and output members of the inner damper 14 can turn relative to each other is determined by the length of the slots 74.

The disc 57 between the flange 3a of the flywheel 3 and the discs 49, 64 is provided with the circumferentially extending elongated slots 74a which receive the heads 65b of the adjacent distancing elements 65.

The coil springs 63 of the first damper 13 are weaker and lighter than the coil springs 69 of the second damper 14. As described above, the coil springs 69 react against the discs 57, 58 and bear against the flange 64 or vice versa. FIG. 1 shows that the common plane of the coil spring 63 coincides with or is closely adjacent the common plane of the coil springs 69. In other words, the axes of all coil springs 63, 69 can be said to be located in a common plane which is normal to the axes of the flywheels 3 and 4.

In accordance with a presently preferred embodiment of the improved apparatus 1, the length of the windows 60, 61, 62 for the coil springs 63 (as seen in the circumferential direction of the flywheels 3 and 4) equals or closely approximates the length of the windows 66, 67, 68 for the coil springs 69. Consequently, and if the condition of coil springs 63 and 69 as shown in FIG. 2 corresponds to predetermined starting or neutral angular positions of the flywheels 3 and 4 relative to each other, the coil springs 63 will begin to store energy simultaneously with the coil springs 69. Furthermore, the so-called stop pin torque of the damper 13 preferably equals or approximates the stop pin torque of the damper 14. This means that the distancing elements 59 reach the ends of the respective slots 73 simultaneously with the distancing elements 65 (the distancing elements 65 then reach the ends of the respective slots 74).

The apparatus 1 further comprises a friction generating unit 75 which operates in parallel with the coil springs 63 and 69 of the respective dampers 13 and 14. The friction generating unit 75 comprises a friction ring 76 which operates between the adjacent surface 77 of the radial flange 3a of the flywheel 3 and the disc 57 to thus ensure that the two sets of coil springs 63, 69 are disposed in series. The friction ring 76 can be centered either by the surface 77 of the flange 3a or by the disc 57. In the latter instance, the friction ring 76 can be bonded (for example, by a suitable adhesive) to the disc 57. If desired, the flange 3a of the flywheel 3 and/or the disc 57 can be provided with radially disposed projections which serve as a means for centering the friction ring 76. For example, the flange 3a of the flywheel 3 can be provided with a suitably configured circumferentially extending shoulder which either surrounds the radially outermost portion or is surrounded by the radially innermost portion of the friction ring 76.

Figure 3:
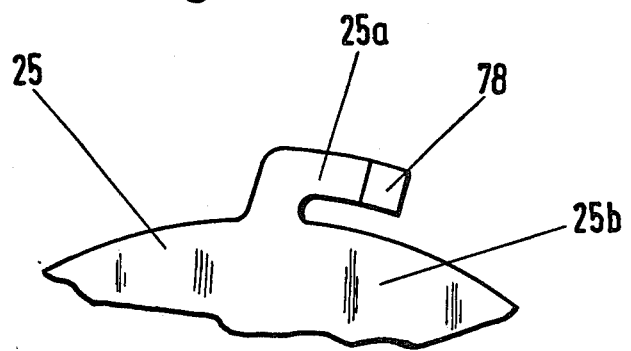
FIG. 3 is a fragmentary front elevational view of a detail in the apparatus of FIG. 1.

FIG. 3 shows that the disc 25 is provided with integral arms 25a (only one arm is actually shown) which extend in the circumferential direction of the disc 25. The arms 25a are resilient in the axial direction with reference to the main body portion 25b of the disc 25 so as to ensure that the friction linings 78 at the free ends of the arms 25a are axially offset relative to the main body portion 25b during assembly of the apparatus 1. The arms 25a are stressed in the axial direction so that the friction linings 78 on the tips of such arms are in frictional engagement with the disc 58 and, at the same time, the disc 58 (and hence the disc 57 which is connected thereto by distancing element 59) is urged axially in a direction toward the flange 3a of the flywheel 3. In this manner, the friction ring 76 is maintained in requisite engagement with the surface 77 of the flange 3a as well as with the disc 57. The force which is applied by the resilient arms 25a of the disc 25 is taken up by the antifriction bearing 18.

FIG. 2 shows that the distancing elements 59 which connect the discs 57 and 58 to each other are disposed (with reference to the coil springs 63 and 69) in such a way that the torque which is applied to the discs 57, 58 by the springs 63, 69 under the action of centrifugal force acts in opposite directions with reference to the locations where such discs are connected with the distancing elements 59. This can be readily seen by considering the line 79 which connects the axes of two neighboring distancing elements 59 in the upper portion of FIG. 2. The line 79 is disposed between the adjacent radially outer coil springs 63 and the adjacent radially inner coil springs 69. The just described distribution of distancing elements 59, coil springs 63 and coil springs 69 ensures that the discs 57, 58 are not subjected to pronounced stresses which would tend to impart to such discs a substantially frustoconical shape. In other words, centrifugal force which acts upon the coil springs 63, 69 cannot entail any deformation of the discs 57, 58 in a manner such as to impart to the discs the shape of hollow conical frusta.

The mode of operation of the improved apparatus 1 will be described with reference to the diagram of FIG. 4. The angular displacement of the flywheels 3 and 4 relative to each other is measured (in degrees) along the abscissa, and the magnitude of transmitted torque (M) is measured along the ordinate. The torque M is transmitted by the friction generating device 15, by the slip clutch 16 as well as by the elastic dampers 13 and 14. It is to be noted that the magnitude of torque which is transmitted by the slip clutch 16 is variable because it is a function of centrifugal force. This is due to the fact that the bias of the axially offset radially inner portion 35 of the diaphragm spring 33 upon the disc 29 varies in response to increasing or decreasing rotational speed of the flywheels 3 and 4. It is assumed that the radially inwardly extending projections 54 of the flange 32 are disposed in the respective cutouts 55 of the flange 49 in such a way that the flywheels 3 and 4 are capable of performing maximum angular movements relative to each other. In other words, the angular positions of the flanges 32 and 49 are such that these flanges can turn through the maximum possible angle relative to one another.

When the flywheels 3 and 4 assume the starting or neutral angular positions (80) relative to each other and one of the flywheels 3, 4 is caused to turn relative to the other flywheel (let it be assumed that the flywheel 3 begins to turn relative to the flywheel 4), the coil spring 63 of the outer damper 13 as well as the coil springs 69 of the inner damper 14 begin to store energy because such coil springs are disposed in series. The spring 63 and 69 continue to store energy until the torque which is transmitted thereby overcomes the moment of the friction generating device 15. This takes place after the flywheel 3 completes an angle 81. If the flywheel 3 continues to turn relative to the flywheel 4 in the same direction, the friction generating device 15 slips until the projections 54 of the flange 32 reach the ends of the respective cutouts 55 in the flange 49. The corresponding angle is shown in FIG. 4 at 82. The angle 82 can be selected within a wide range. In most instances, it is advisable to keep the angle 82 within the range of 10 and 120 degrees. As mentioned above, in the embodiment which is shown in FIG. 2 the angle 82 is approximately 25 degrees.

If the flywheel 3 continues to turn relative to the flywheel 4 in the same direction, the coil springs 63 and 69 of the respective dampers 13 and 14 are caused to store additional energy because the moment of friction of the slip clutch 16 is greater than that torque which can be transmitted by the dampers 13 and 14. The coil springs 63 and 69 continue to store energy while the flywheel 3 turns through an additional angle 83, namely until the distancing elements 59 and 65 reach the ends of the respective slots 73 and 74 so that the dampers 13 and 14 do not permit any additional angular displacements of the flywheels 3 and 4 relative to each other.

As mentioned above, the stop pin or stop torque of the damper 13 preferably matches or approximates that of the damper 14, i.e., the distancing elements 59 reach the ends of the respective slots 73 simultaneously with the distancing elements 65 which then strike against the surfaces at the ends of the respective slots 74. Further angular displacement of the flywheel 3 relative to the flywheel 4 is possible only if the torque which is transmitted by the engine to the flywheel 3 (e.g., due to the presence of pronounced peaks in the magnitude of transmitted torque) exceeds the torque which can be transmitted by the slip clutch 16. As stated above, the magnitude of torque which is transmitted by the slip clutch 16 is dependent upon the rotational speed of the flywheels. Such torque is indicated in FIG. 4 at 84. In the diagram of FIG. 4, the slip torque 84 of the slip clutch 16 exceeds the moment or torque 85 at which the dampers 13, 14 cannot store additional energy and are simply bypassed. Under certain circumstances, it is advisable if the torque which can be transmitted by the slip clutch 16 is smaller (up to a certain RPM) than the torque at which the coil springs 63 and 69 of the dampers 13 and 14 cannot store additional energy. When the magnitude of torque which can be transmitted by slip clutch 16 is exceeded, the flywheels 3 and 4 can turn relative to each other through any desired angle. In other words, there is nothing in the form of abutments or stops which would prevent infinite rotation of the flywheels 3 and 4 relative to each other as soon as the magnitude of torque which can be transmitted by the slip 16 is exceeded.

In the embodiment which is shown in FIGS. 1-4, the torque 84 of the slip clutch 16 corresponds to the minimum torque that can be transmitted by the slip clutch 16. Thus, the slip clutch 16 can transmit a torque even when the internal combustion engine is idle.

As a rule, the minimum torque which is transmittable by the slip clutch 16 should be between 0 and 300 percent of the nominal torque of the internal combustion engine. The effectively required minimum slip torque depends upon the intended utilization of the apparatus 1 and upon the mode of operation of the internal combustion engine. For a majority of applications, a slip torque (84) of the slip clutch 16 which is between 130 and 250 percent of the nominal torque of the internal combustion engine is entirely satisfactory.

The torque which can be transmitted by the friction generating device 15 is preferably between 30 and 90 percent of the nominal torque of the internal combustion engine. Here, again, the actual magnitude of torque which can be transmitted by the slip clutch 15 will depend upon the intended use of the apparatus and the characteristics of the internal combustion engine. In a large majority of cases, a moment or torque of the friction generating device 15 in the range of 40 to 80 percent of the nominal torque of the internal combustion engine is quite satisfactory.

As can be readily ascertained upon perusal of the preceding description, the angle of rotation of the flywheels 3 and 4 during which a resilient restoring force is active between the flywheels can be divided into sections each of which is determined by one of the dampers 13 and 14. Consequently, relative movements of the coil springs 63 and 69 with reference to the parts which act upon them, namely the flange 49 and the discs 57, 58 for the springs 63 as well as the flange 62 and the discs 57, 58 for the springs 69, are reduced accordingly. Such reduction of relative movements of the coil springs 63 and 69 ensures that the wear upon the surfaces of contact between the springs 63, 69 and discs 57, 58 (springs 63) and discs 49, 64 (springs 69) is reduced to a surprising extent. The broken-line curve 86 of FIG. 4 indicates the torque which can be transmitted by the slip clutch 16 in response to increasing rotational speed of the internal combustion engine.

Referring again to FIG. 2, it is possible to provide resilient stop means in the form of relatively weak coil springs 87 at both sides of each radially inwardly extending projection 54 of the flange 32. The springs 87 react against the surfaces at the ends of the cutouts 55 in the flange 49 and bear against the respective sides of the adjacent projections 54. The purpose of the springs 87 is to prevent a sudden impact of projections 54 against the surfaces at the ends of the respective cutouts 55. The effect of coil springs 87 was not considered in the diagram of FIG. 4. The diagram of FIG. 4 further disregards the effect of the friction generating unit 75 which operates in parallel with the dampers 13 and 14, i.e., without considering the moment of friction which is generated by the unit 75.

The slip clutch 16 constitutes an optional but desirable feature of the improved apparatus. As shown, this slip clutch can be installed between one (3) of the flywheels 3, 4 and the friction generating device 15. If the friction generating device 15 received torque from the second damper of a series of two dampers, the slip clutch 16 can be installed between the friction generating device 15 and the flywheel 4.

The apparatus can comprise several friction generating units 75, for example, one in parallel with each of the dampers 13, 14.

The feature that the stop pin torque of the damper 13 matches that of the damper 14 is often desirable and advantageous because this ensures that, when the flywheels 3, 4 are caused to leave their neutral or starting positions (in which neither of the flywheels tends to transmit torque to the other flywheel), the coil springs 63 begin to store energy simultaneously with the coil springs 69. However, it is equally possible to construct the improved apparatus in such a way that the stop pin torque of the damper 13 deviates from that of the damper 14. Furthermore, the extent of angular displacement of the flywheels 3, 4 relative to each other while the coil springs 63 store energy may but need not match the extent of angular displacement while the coil springs 69 undergo deformation.

An advantage of the feature that the slip clutch 16 receives torque from the flywheel 3 by way of two friction rings (when the wheel 3 is driven to transmit torque to the flywheel 4) in such a way that the output member 32 of the slip clutch can be moved into form-locking engagement with the output member 49 of the friction generating device 15 (and the output member of the device 15 is the input member of the first damper 13) is that the slip clutch 16 (which allows for unlimited angular displacement of the flywheels 3 and 4 relative to each other) is actuated when the friction generating device 15 (which is active only within a certain angle) has reached the end of its range of operation.

The coil springs 63 constitute a means for force-lockingly coupling the input and output members 49 and 57, 58 of the first damper 13 with each other, and the output member 57, 58 of the damper 13 is the input member of the damper 14. The coil springs 69 establish a force-locking connection between the input and output members 57, 58 and 64 of the damper 14, and the output member 64 of the damper 14 is rigid with the flywheel 14. As shown, the radial distance of the means 65 for connecting the output member 64 of the damper 14 with the flywheel 4 from the axes of the flywheels 3 and 4 equals or approximates the radial distance between such axes and the coil springs 69. An advantage of such design is that it contributes to compactness of the apparatus 1 because the connecting means (distancing elements 65) does not require any additional space in the radial direction of the flywheels 3 and 4.

An advantage of the feature that the output member 32 of the slip clutch 16 is disposed radially outwardly of the input member 49 of the damper 13 (this input member 49 is the output member of the friction generating device 15) is that this also contributes to compactness of the apparatus. The feature that the output member 49 of the friction generating device 15 is a disc which constitutes the input member of the first damper 13 contributes to compactness of the apparatus, as seen in the axial direction of the flywheels 3 and 4. Alternatively, each of these members can include a pair of discs with each disc of one pair coplanar with a different disc of the other pair. As shown, the flange-like input member 49 of the damper 13 can be flanked by two disc-shaped output members 57, 58 which constitute the input member of the damper 14, and the latter comprises a flange-like output member 64 which is disposed in the space between the disc-shaped output-input members. This contributes to simplicity, compactness, lower cost and reliability of the apparatus, and more particularly of its dampers 13 and 14. The feature that the output members 32, 49 and 64 of the slip clutch 16, friction generating device 15 and damper 14 are disposed in a common plane which extends at right angles to the axes of the flywheels 3 and 4 also contributes to simplicity and compactness of the apparatus. As shown, the output member 32 of the slip clutch 16 is disposed radially outwardly of the output member 49 of the friction generating device 15, and the output member 49 is disposed radially outwardly of the output member 64 of the damper 14.

The provision of slots 74 in the disc 58 of the output member 57, 58 of the damper 13 for the distancing elements 65 which connect the output member 64 of the damper 14 with the flywheel 4 renders it possible to ensure a preselected angle of operation of the damper 14 by appropriate selection of the length of the slots 74 and diameters of the bosses 65a of the distancing elements 65.

The provision of distancing elements 59 which connect the discs 57, 58 of the output member of the first damper 13 to each other and of the respective slots 73 in the flange 49 (input member of the damper 13) also contributes to simplicity and compactness of the apparatus. The length of the slots 73 determines the range of operation of the damper 13. The placing of the slots 73 at the same radial distance from the axis of the bearing 18 as the coil springs 63 of the damper 13 contributes additionally to compactness of the damper 13 and of the entire apparatus 1. It suffices if a single distancing element 59 extends through each of the slots 73.

The placing of the relatively weak coil springs 63 radially outwardly of the stronger coil springs 69 contributes to the ability of such coil springs to withstand the deforming action of centrifugal forces. The number of weaker coil springs 63 exceeds the number of coil springs 69, and the number of springs 63 is preferably a whole multiple (e.g., twice) of the number of the springs 69. The illustrated distribution of coil springs 63 and 69 in such a way that they are staggered relative to each other (as considered in the circumferential direction of the flywheels 3 and 4) is desirable and advantageous because this contributes to compactness of the dampers 13 and 14. It is further preferred to rely on the illustrated distribution of coil springs 63 and 69 (i.e., such that pairs of springs 63 alternate with discrete springs 69, as seen in the circumferential direction of the flywheels) on the ground that this renders it possible to provide the slots 73 and the distancing elements 59 between pairs of coil springs 63. As shown in the lower part of FIG. 2, the slots 74 and the respective distancing elements 65 alternate with discrete coil springs 69. The distance from the axes of the flywheels 3, 4 to the distancing elements 65 is the same as that from these axes to the coil springs 69.

As discussed above, the flange-like input member 49 of the damper 13 is or can be centered by the flange-like output member 64 of the damper 14. This contributes to simplicity and compactness of the apparatus. The output member 64 of the damper 14 is preferably centered by one of the flywheels 3 and 4. Such centering of the output member 64 of the damper 14 exhibits the advantage that a relative movement of the neighboring surfaces on the output member 64 of the damper 14 and the adjacent flywheel 4 takes place only when the friction generating device 15 is active, i.e., only when the magnitude of transmitted torque fluctuates within a rather wide range or during transition from transmission of torque from the engine to the change-speed transmission to transmission of torque in the opposite direction (coasting). Minor fluctuations of transmitted torque are absorbed by the serially connected dampers 13 and 14. This reduces the likelihood of pronounced wear in the region where the input member 49 of the damper 13 is centered.

The placing of coil springs 63 and 69 into or close to a common plane (which extends at right angles to the axes of the flywheels 3 and 4) contributes still further to compactness and simplicity of the improved apparatus.

The coil springs 87 constitute optional but desirable components of the apparatus 1. They reduce the likelihood of pronounced impacts and of the generation of noise when the ranges of operation of the friction generating device 15 (which operates without any resilient or other restoring means) is completed or exhausted.

It will be seen that a large majority of components of the improved apparatus can constitute very simple plate-like or disc-shaped parts which can be mass-produced at a low cost and can be assembled in automated or fully automatic machines.

In the illustrated apparatus, the friction generating device 15 is followed (in the direction of transmission of torque from the crankshaft 5 to the input shaft 10) by the first damper 13, and the latter is followed by the second damper 14. However, it is equally within the purview of the invention to place the friction generating device 15 downstream of the dampers 13 and 14 (again as seen in the direction of the flow of power from the engine to the transmission) or to install the device 15 between the dampers 13 and 14. In each instance, the coil springs 63 and 69 of the dampers 13 and 14 merely undergo deformation during a certain stage of angular movement of the flywheels 3 and 4 relative to each other which results in a considerable reduction of wear upon the coil springs as well as on the parts which are in contact therewith (i.e., on the parts which define the respective sets of registering windows 60-62 and 66-68).

Another advantage of the apparatus 1 is that the total angular displacement which involves rotation of the flywheels 3 and 4 relative to each other against the opposition of the coil springs 63 and 69 is split up into two stages. Therefore, the lengths of these coil springs can be reduced accordingly which ensures that their resistance to deformation in the radial direction of the flywheels (i.e., at right angles to their respective axes) is much more pronounced than in the case of relatively long coil springs. This, in turn, ensures that the coil springs 63 and 69 can more readily withstand the deforming action of centrifugal forces. Consequently, the coil springs are properly supported in the radial direction while being capable of transmitting torque in the circumferential direction of the flywheels 3 and 4. Still further, the weight of the relatively short coil springs 63 and 69 is but a fraction of the weight of relatively long energy storing resilient elements which are used in conventional apparatus; this also contributes to greater rigidity in the axial direction because the lightweight coil springs are not acted upon by large centrifugal forces. More satisfactory rigidity and resulting greater resistance to deformation in the radial direction of the flywheels 3 and 4 contribute to a reduction of wear because the relatively lightweight but rigid coil springs are less likely to perform stray movements and to rub against the adjacent parts.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for transmission of torque between two flywheels which are rotatable relative to each other, the first of which is connectible with an output element of an engine and the second of which is connectable with an input element of a change-speed transmission in a motor vehicle, comprising a friction generating device having means for opposing rotation of the flywheels relative to each other through a predetermined angle without biasing the flywheels counter to their directions of rotation relative to each other, at least within a portion of said predetermined angle; and two dampers operating in series with one another and with said friction generating device.

2. The apparatus of claim 1, further comprising slip clutch means in series with said friction generating device.

3. The apparatus of claim 1, wherein at least one of said dampers comprises a set of energy storing elements and at least one friction generating unit.

4. The apparatus of claim 1, wherein said dampers include means for simultaneously opposing rotation of the flywheels relative to each other, starting from a neutral angular position of the flywheels.

5. The apparatus of claim 1, wherein said dampers have different stop torques.

6. The apparatus of claim 1, wherein said dampers have substantially identical stop torques.

7. The apparatus of claim 1, further comprising slip clutch means in series with said friction generating device, said dampers including a first damper and a second damper in series with said first damper, said slip clutch means being arranged to receive torque from one of the flywheels and having an output member, said friction generating device having an output member arranged to form-lockingly engage the output member of said slip clutch means and, said first damper having an input member which constitutes the output member of said friction generating device.

8. The apparatus of claim 7, further comprising cooperating friction rings interposed between the one flywheel and said slip clutch means.

9. The apparatus of claim 7, wherein said first damper further comprises an output member and energy storing means interposed between the input and output members of said first damper, said second damper having an input member which constitutes the output member of said first damper.

10. The apparatus of claim 9, wherein said second damper further comprises an output member, energy storing means interposed between the input and output members of said second damper, and means for non-rotatably securing the output member of the second damper to the other flywheel, said securing means being disposed at a predetermined radial distance from the axes of the flywheels and the energy storing means of the second damper being disposed at or close to said predetermined distance from the axes of the flywheels.

11. The apparatus of claim 10, wherein the output member of said slip clutch means is disposed radially outwardly of the input member of said first damper, the input member of said first damper being integral with the output member of said friction generating device.

12. The apparatus of claim 11, wherein the output member of said slip clutch means comprises a first disc and the input member of said first damper includes a second disc disposed in or close to the plane of said first disc.

13. The apparatus of claim 1, wherein said dampers include a first damper and a second damper in series with said first damper, each of said dampers comprising an input member and an output member and the output member of said first damper comprising two disc-shaped members flanking the input member of said first damper and constituting the input member of said second damper, the output member of said second damper being disposed between said disc-shaped members.

14. The apparatus of claim 1, further comprising slip clutch means in series with said friction generating device, said dampers including a first damper and a second damper in series with said first damper, said slip clutch means, said dampers and said friction generating device each having an input member and an output member, the output member of said friction generating device being integral with the input member of said first damper and the output members of said friction generating device, said slip clutch means and said second damper being disposed at different radial distances from the axes of the flywheels.

15. The apparatus of claim 14, wherein the output members of said slip clutch means, said friction generating device and said second damper are disposed in or close to a common plane which extends at right angles to the axes of the flywheels.

16. The apparatus of claim 1, wherein each of said dampers has an input and an output member and further comprising means for securing the output member of one of said dampers to one of said flywheels with predetermined freedom of angular movement of the output member of said one damper relative to the one flywheel, the output member of said one damper comprising two discs and one of said discs having at least one slot, said securing means comprising a distancing element anchored in said one flywheel and extending into said slot with said predetermined freedom of movement of the distancing element and the one disc relative to each other.

17. The apparatus of claim 1, wherein one of said dampers has input and output members and said output member comprises two spaced-apart discs, said one damper further comprising at least one distancing element connecting said discs to one another for joint rotation and said input member having a slot for a portion of said distancing element, said portion of said distancing element being received in said slot with predetermined freedom of angular movement of said input and output members relative to one another.

18. The apparatus of claim 17, wherein said one damper further comprises at least one resilient energy storing element between said input and output members, said energy storing element being disposed at a predetermined radial distance from the axes of the flywheels and said distancing element being disposed at or close to said predetermined distance from the axes of the flywheels.

19. The apparatus of claim 1, wherein each of said dampers comprises a set of energy storing elements and the mass of the energy storing elements of one of said dampers is less than the mass of the energy storing elements of the other of said dampers.

20. The apparatus of claim 1, wherein each of said dampers comprises a set of energy storing elements and the number of energy storing elements in one of said dampers exceeds the number of energy storing elements in the other of said dampers.

21. The apparatus of claim 1, wherein each of said dampers comprises an annulus of energy storing elements and the energy storing elements of one of said dampers are staggered with reference to the energy storing elements of the other of said dampers in the circumferential direction of the flywheels.

22. The apparatus of claim 21, wherein pairs of energy storing elements of said one damper alternate with discrete energy storing elements of said other damper in the circumferential direction of the flywheels.

23. The apparatus of claim 1, wherein said dampers include a first damper and a second damper in series with said first damper, each of said dampers comprising an input member, an output member and a set of energy storing elements between the respective input and output members, the input member of said first damper having a least one slot disposed radially outwardly of an energy storing element of said second damper and a distancing element extending through said slot with a predetermined freedom of angular movement in the circumferential direction of the flywheels.

24. The apparatus of claim 1, wherein said dampers include a first damper and a second damper in series with said first damper, each of said dampers comprising an input member, an output member and a set of energy storing elements between the respective input and output members, the input member of said second damper having at least one slot disposed between two energy storing elements of said second damper and located radially inwardly of two energy storing elements of said first damper, and further comprising means for securing the output member of said second damper to one of the flywheels with a predetermined freedom of angular movement of the one flywheel and the output member of said second damper relative to each other, said securing means comprising a distancing element anchored in the one flywheel and extending into said slot with said predetermined freedom of movement relative to the output member of said second damper in the circumferential direction of the flywheels.

25. The apparatus of claim 1, wherein each of said dampers has an input member and an output member and the output member of one of said dampers has means for centering the input member of the other of said dampers.

26. The apparatus of claim 1, wherein each of said dampers includes a plurality of energy storing elements and the energy storing elements of one of said dampers are coplanar with the energy storing elements of the other of said dampers.

27. The apparatus of claim 1, wherein said friction generating device comprises input and output members which are movable angularly relative to each other in the circumferential direction of the flywheels through a predetermined distance and further comprising resilient stop means operative to damp the impact of said input and output members upon each other shortly prior to completion of angular movement through said predetermined distance.

28. The apparatus of claim 27, wherein one of said input and output members has a projection and the other of said input and output members has a cutout into which said projection extends with freedom of angular movement through said predetermined distance, said resilient stop means being disposed in said cutout and flanking said projection.

* * * * *